US 6,687,253 B1

(12) United States Patent
Reed et al.

(10) Patent No.: US 6,687,253 B1
(45) Date of Patent: Feb. 3, 2004

(54) SCALEABLE WORMHOLE-ROUTING CONCENTRATOR

(75) Inventors: Coke Reed, Princeton, NJ (US); John Hesse, Moss Beach, CA (US)

(73) Assignee: Interactic Holdings, LLC

( * ) Notice: Subject to any disclaimer, the term of this patent is extended or adjusted under 35 U.S.C. 154(b) by 448 days.

(21) Appl. No.: 09/693,357

(22) Filed: Oct. 19, 2000

(51) Int. Cl.[7] .............................. H04J 3/02; H04L 12/56
(52) U.S. Cl. ...................................... 370/406; 370/427
(58) Field of Search ................................ 370/427, 477, 370/498, 532, 389, 380, 388, 406

(56) References Cited

U.S. PATENT DOCUMENTS

| | | | |
|---|---|---|---|
| 5,280,586 A | * | 1/1994 | Kunz et al. ..................... 710/2 |
| 5,408,231 A | | 4/1995 | Bowdon |
| 5,535,197 A | | 7/1996 | Cotton |
| 5,541,914 A | * | 7/1996 | Krishnamoorthy et al. . 370/427 |
| 5,649,108 A | | 7/1997 | Spiegel et al. |
| 5,859,981 A | | 1/1999 | Levin et al. |
| 5,917,426 A | | 6/1999 | Yoshifuji |

FOREIGN PATENT DOCUMENTS

| | | |
|---|---|---|
| EP | 0 868 104 A2 | 9/1998 |
| EP | 0 966 123 A2 | 12/1999 |
| EP | 0 966 123 A3 | 2/2001 |
| WO | WO 97/30555 | 8/1997 |

* cited by examiner

Primary Examiner—Min Jung

(57) ABSTRACT

An interconnect structure substantially improves operation of an information concentrator through usage of single-bit routing through control cells using a control signal. The interconnect structure and operating technique support wormhole routing and flow of messages. Message packets are always buffered within the structure and never discarded, so that any packet that enters the structure is guaranteed to exit. In one example, the interconnect structure includes a ribbon of interconnect lines connecting a plurality of nodes in nonintersecting paths. The ribbon of interconnect lines winds through a plurality of levels from the source level to the destination level. The number of turns of a winding decreases from the source level to the destination level. The interconnect structure further includes a plurality of columns formed by interconnect lines coupling the nodes across the ribbon in cross-section through the windings of the levels.

28 Claims, 10 Drawing Sheets

SCALEABLE WORMHOLE-ROUTING CONCENTRATOR

RELATED PATENTS AND APPLICATIONS

This application is related to U.S. Pat. No. 6.289,021 which is incorporated herein by reference in its entirety. This application is also related to and incorporates U.S. Pat. No. 5,996,020 herein by reference in its entirety.

The disclosed system and operating method are related to subject matter disclosed in the following co-pending patent applications that are incorporated by reference herein in their entirety:
1. U.S. patent application ser. No. 09/693,359 entitled, "Scaleable Multi-Path Wormhole Interconnect", naming John Hesse as inventor and filed on even date herewith;
2. U.S. patent application ser. No. 09/693.603 entitled, "Scaleable Interconnect Structure for Parallel Computing and Parallel Memory Access", naming John Hesse and Coke Reed as inventors and filed on even date herewith;
3. U.S. patent application ser. No. 09/693.358 entitled, "Scaleable Interconnect Structure Utilizing Quality-of-Service Handling", naming Coke Reed and John Hesse as inventors and filed on even date herewith;
4. U.S. patent application Ser. No. 09/69 ,073 entitled, "Scaleable Aparatus and Method for Increasing Throughput In Multiple Level Minimum Logic Networks Using a Plurality of Control Lines", naming John Hesse and Coke Reed as inventors and filed on even date herewith.

BACKGROUND Of THE INVENTION

A communication or computing network is composed of several or many devices that are physically connected through a communication medium, for example a metal or fiber optic cable. One type of device that can be included in a network is a concentrator. For example, a large-scale time-division switching network may include a central switching network and a series of concentrators that are connected to input and output terminals of other devices in the switching network.

Concentrators are typically used to support multiport connectivity to a network. A concentrator is a device that is connected to a plurality of shared communications lines that concentrates information onto fewer lines. Concentrators inherently reduce the capacity of an interconnect path by increasing the occurrence of blocking and data loss, or by calling for storage of information in buffers.

A persistent problem that arises in massively parallel computing and in communications occurs when moving the data to the processors and users. This problem is exacerbated in systems that incorporate concentrators due to the inherent reduction in capacity.

What is needed is a concentrator structure that rapidly routes data and improves information flow by avoiding blockages, that is scaleable virtually without limit, and that supports low latency and high throughput.

SUMMARY OF THE INVENTION

An interconnect structure substantially improves operation of an information concentrator through usage of single-bit routing through control cells using a control signal. The terms "cell" or "control cell" refer to a simple switching element. The term "node" refers to a cell or group of cells that operate as a unit. The interconnect structure and operating technique support wormhole routing and flow of messages. Message packets entering the structure are never discarded, so that any packet that enters the structure is guaranteed to exit.

In accordance with an aspect of the present invention, an interconnect structure includes a ribbon of interconnect lines connecting a plurality of nodes in nonintersecting paths. The ribbon of interconnect lines winds through a plurality of levels from the source level to the destination level. The number of turns of a winding decreases from the source level to the destination level. The interconnect structure further includes a plurality of columns formed by interconnect lines coupling the nodes across the ribbon in cross-section through the windings of the levels. A method of communicating data over the interconnect structure incorporates a high-speed minimum logic method for routing data packets down multiple hierarchical levels.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION

Figure 1:
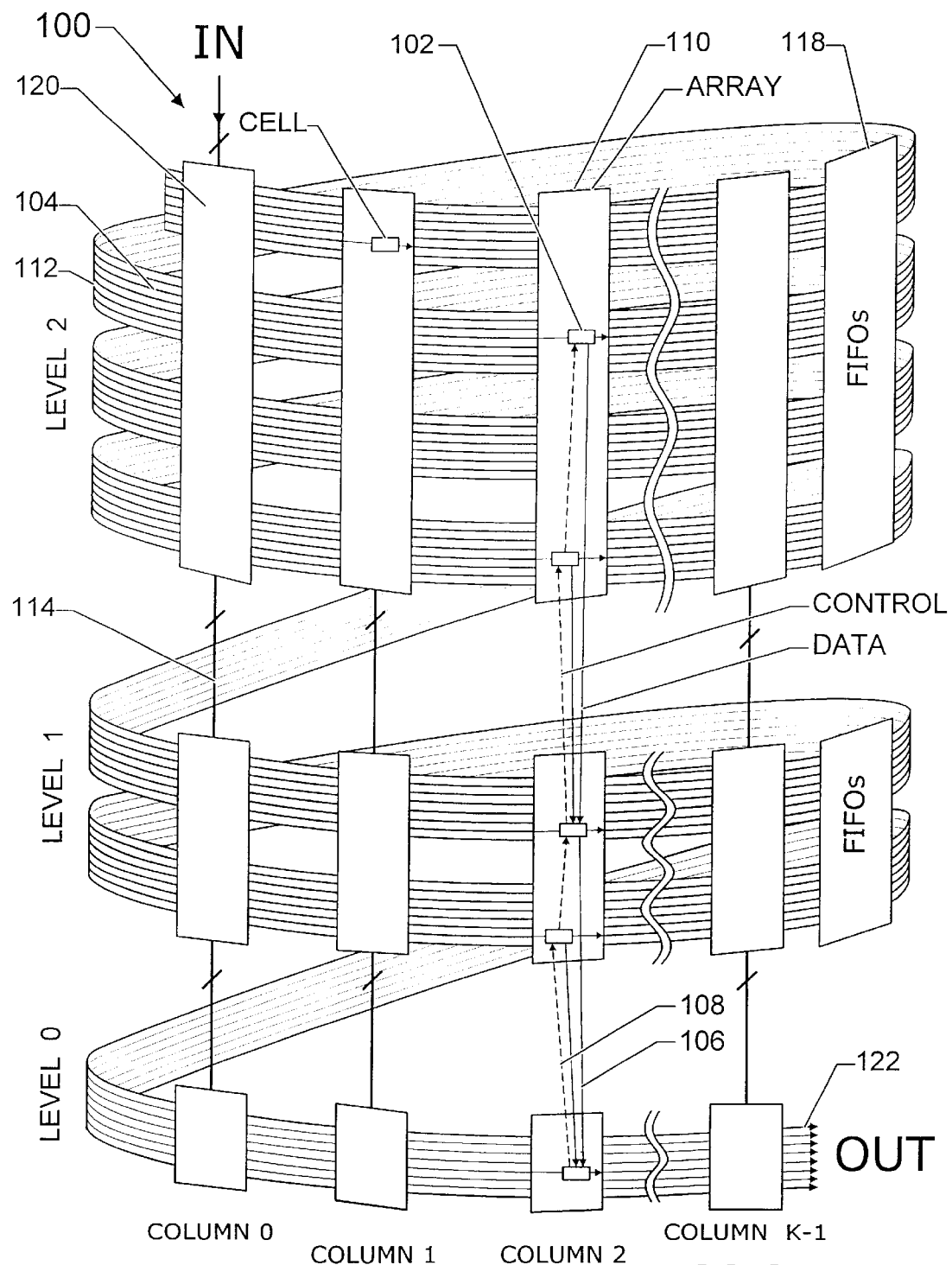
FIG. 1 is a block diagram that shows an example of a data interconnect structure in the form of a multiple-level 32:8 concentrator.

Referring to FIG. 1, a block diagram shows an example of a data interconnect structure in the form of a multiple-level 32:8 concentrator 100 that includes three levels and K columns. Levels are hierarchical and enumerated 0, 1 and 2 from the bottom upward, and the columns are enumerated 0 through K−1 from left to right. The concentrator 100 receives input data from 32 lightly-loaded data-carrying lines and passes the data into eight lines that are more heavily-loaded. In the illustrative example, data packets travel in an eight-wide "ribbon" of rows from a 32-port input terminal 120 to an eight-port output terminal 122. The ribbon 112 includes an eight-wide set of control cells 102 located in control arrays 110 at each column, and shift registers (FIFOs) 118, located to the right of column K. The bottom output level does not include FIFOs. The topology of the ribbon 112 can be described as a wrapping in a barber-pole fashion as is illustrated in FIG. 1. Data are in the form of packets 200 illustrated in FIG. 2. The ribbon 112 wraps around level 2 four times, around level 1 twice, and passes once through level 0. Accordingly, level 2 has 32 rows of cells and 32 FIFOs, level 1 has 16 rows of cells and 16 FIFOs, and level 0 has eight rows of cells with no FIFOs. The width of the ribbon is typically equal to the number of output ports although other configurations are practical.

The illustrative interconnect structure shown in FIG. 1 has an eight-wide ribbon of data transmission lines. The individual lines are divided into seven segments, each segment being sufficiently long to contain one message. Each data transmission line in the eight-wide ribbon connects a sequence of nodes. The eight-wide ribbon is wound into a typically spiral formation with some interconnection between nodes on different windings. Data can progress along the data transmission line from node to node in a first-in-first-out operation. Data moves from a system input port through the interconnect structure to a system output port. Each node B on the data transmission line L except a node in column 0 level 2 in the top eight lines of the interconnect structure has an immediate predecessor node A on the data transmission line L. Each node B on the data transmission line L has an immediate successor C that is on the data transmission line L or is an output port. The node A is always capable of sending data to node B. Node B is always capable of sending data to node C. Data sent from node A to node B and data sent from node B to node C are always unblocked.

Some nodes are located in a FIFO region of the ribbon. Nodes in the FIFO region have only one input port and one output port.

Some nodes have additional input ports that permit data to enter from outside the transmission line ribbon.

Some nodes have secondary input ports that enable data to enter the node from a node further upstream in the transmission line ribbon. The further-upstream node is typically on a previous winding of the ribbon in comparison to the present node.

Some nodes have one or more secondary output ports that enable data transmission further down the ribbon nearer to the ribbon system output ports. Nodes with multiple output ports have associated logic that always attempts to transmit the message forward towards the system output ports as far as possible rather than transmitting the message to the immediate successor node along the transmission line ribbon.

Nodes with multiple input ports have a priority assigned to the input ports. Messages from immediate successors always have priority over messages from nodes that are not immediate successors. Nodes that have multiple input ports connected to nodes that are not immediate predecessors also have a priority relationship for receiving data.

In summary, nodes always attempt to send data as far down the ribbon as possible but associated with each node B, a priority is defined to receive messages from the various nodes that are capable of sending messages to node B. The top priority is granted to the immediate predecessor node. A set S includes nodes that are capable of sending messages to the node B. A priority relationship is defined among the nodes in set S for sending the messages to the node B. Rules governing the progression of messages forward follow:

1) If a node N is a member of set S and a message M arrives at node N, then node N is never blocked from sending message M to node B by a message from another node in the set S with a lower priority than node N for sending a message to node B.
2) Corresponding to each node N in the set S a set $T_N$ of nodes exists to which node N is capable of routing messages. Logic associated with each node N ranks the members of $T_N$ in a range from a node $N_M$ most desirable to receive message M to a node $N_L$ least desirable to receive message M. Logic associated with node N sends message M to the most desirable unblocked member of set $T_N$.
3) The immediate predecessor node A to node B has the highest priority to send a message to node B.

In FIG. 1, nodes with the ability to transmit and accept messages from nodes on previous windings of the transmission line ribbon, thus nodes that skip segments of the interconnect structure, are located in K control cell columns. Nodes with only a single input port are located in the FIFO section of the interconnect structure.

A message includes a payload preceded by a single-bit header—a single timing bit that is always set to one. Each of the segments corresponds to a row on a level. A row includes K control cells that span the row. Since the message must fit within the K control cells and the FIFO on a single row, the message length cannot exceed the length of the FIFO+CK where C is the number of bits in a control cell. Therefore, the length of the FIFO must be at least the length of the maximum message length less CK. If a system concentrates a large number of messages into R signals, then the ribbon width is R. If the interconnect structure contains L+1 levels and K columns per level, then the system contains $R \cdot (2^{L+1}-1)$ rows with each row containing K control cells and a FIFO having a length of at least the maximum message length less C·K.

In one embodiment, messages are fed into one of the segments of the ribbon at column 0. As the message moves to column 1, the message can continue to pass further along the ribbon segment or the head (first bit) of the message can move ahead, leading the message to another segment nearer the system output port. When the lead by the first bit moves to a new segment of the transmission line ribbon, the message may move to a different transmission line or stay on the same transmission line on the ribbon. When the head of the message reaches a new column, the message may again jump forward to a new segment. In this way, a message may span several segments and, since the bottom level has no FIFO, the first portion of a message may exit the concentrator before the entire message has entered the concentrator.

In the following description the term packet refers to a unit of data, typically in serial form. Examples of data packets include Internet Protocol (IP) packets, Ethernet frames, ATM cells, switch-fabric segment such as a portion of a larger frame or a data packet, parallel computer interprocessor messages, or other data messages that have an upper length limit. A packet traveling across a level passes through K columns of control cells 102. The packet traversing a level can pass directly from one cell to a cell in the next column on the same level. A cell design and method of timing is disclosed in U.S. Pat. No. 6,289,021 in which, for packets traveling between cells on the same level, two bits of a packet are positioned in each of the cells. The same timing can be used in the system disclosed herein although the cell design of the present disclosure is simplified. The FIFO contains the proper number of bits of a packet such that when the packet enters an array at column 0, the header bit 202 is aligned with other header bits of packets that traverse the same level. In the example, a packet fits on a single row such that the timing of packets entering column 0 is synchronized with packets arriving from cells positioned above in the hierarchy.

Timing and control is achieved by assuring that the length in bits of the longest packet does not exceed the number of bits in the FIFO plus the sum of the number of bits in the columns. For example, for packets with an upper length of 400 bits arriving at 400 clock periods in a structure with 12 columns of control cells and each control cell holding two bits, the FIFO length is 376 bits. A first bit of a packet moves from a cell on a particular level to cell on the same level in the next column in two clock ticks or steps. A first bit of a packet moves from a cell on a particular level to a cell one level lower in the next column in one clock tick. Therefore, the length of the FIFOs that connect between levels is one bit fewer to account for the difference in timing between levels. Timing is discussed in detail in U.S. Pat. No. 6.289.021. The length of FIFOs that connect between levels is one bit fewer to account for the difference in timing between levels. Level timing is discussed in detail hereinafter.

The packet is inserted into input array 120 from one of 32 data input ports in the top level. One data input port serves each of the 32 lines in the top level. A packet is inserted in a serial fashion into each of the lines. A packet entering a cell from ribbon 112 in array 120 has priority over a packet attempting to enter the cell from outside the interconnect structure. No internal packet can block a packet from entering top eight rows of the structure, but a packet that traverses the top row of the top level can, under some blocking conditions, wrap around the "barber pole" and reenter the top level eight rows lower in array 120. Packets entering the structure are never discarded so that any packet that enters the structure is guaranteed to exit, a substantial improvement over conventional concentrators.

The packet has priority to travel to the next column of switch arrays over a packet that attempts to enter the interconnect structure from outside the structure. The packet attempting to enter the structure under these circumstances is prohibited from entering.

Although multiple aspects of operation affect transit through the interconnect structure, older packets probabilistically have priority of exiting before newer packets.

In alternative embodiments, packets can enter the ribbon in multiple angles in the top level. For a particular cell on the top level, the first bit of a packet entering the cell from within the structure coincides with the first bit of a packet entering a cell in the same column from outside of the structure. A technique for entering packets into the top level in multiple columns is taught in U.S. Pat. No. 6,289.021 and U.S. Pat. No. 5,996,020.

Alternatively stated, at the top level 32 input lines accept packets from outside the structure. Of the 32 input lines, the top eight input ports are connected at the start of the ribbon and cannot be blocked by packets already in the structure. The remaining 24 input ports can be blocked. Blocking is discussed in detail in the description of FIGS. 4A, 4B, and 4C and in U.S. Pat. No. 6,289,021 and U.S. Pat. No. 5,996,020.

As an alternative to traveling around the spiral in the data-carrying ribbon, a packet can jump ahead from a cell on a higher level to a cell on a lower level in the hierarchy. The jumping process concentrates packets in the ribbon so that the segment of the ribbon at the bottom level advantageously carries more packets, on average, than the segment of the ribbon on the top level.

Figure 4A:
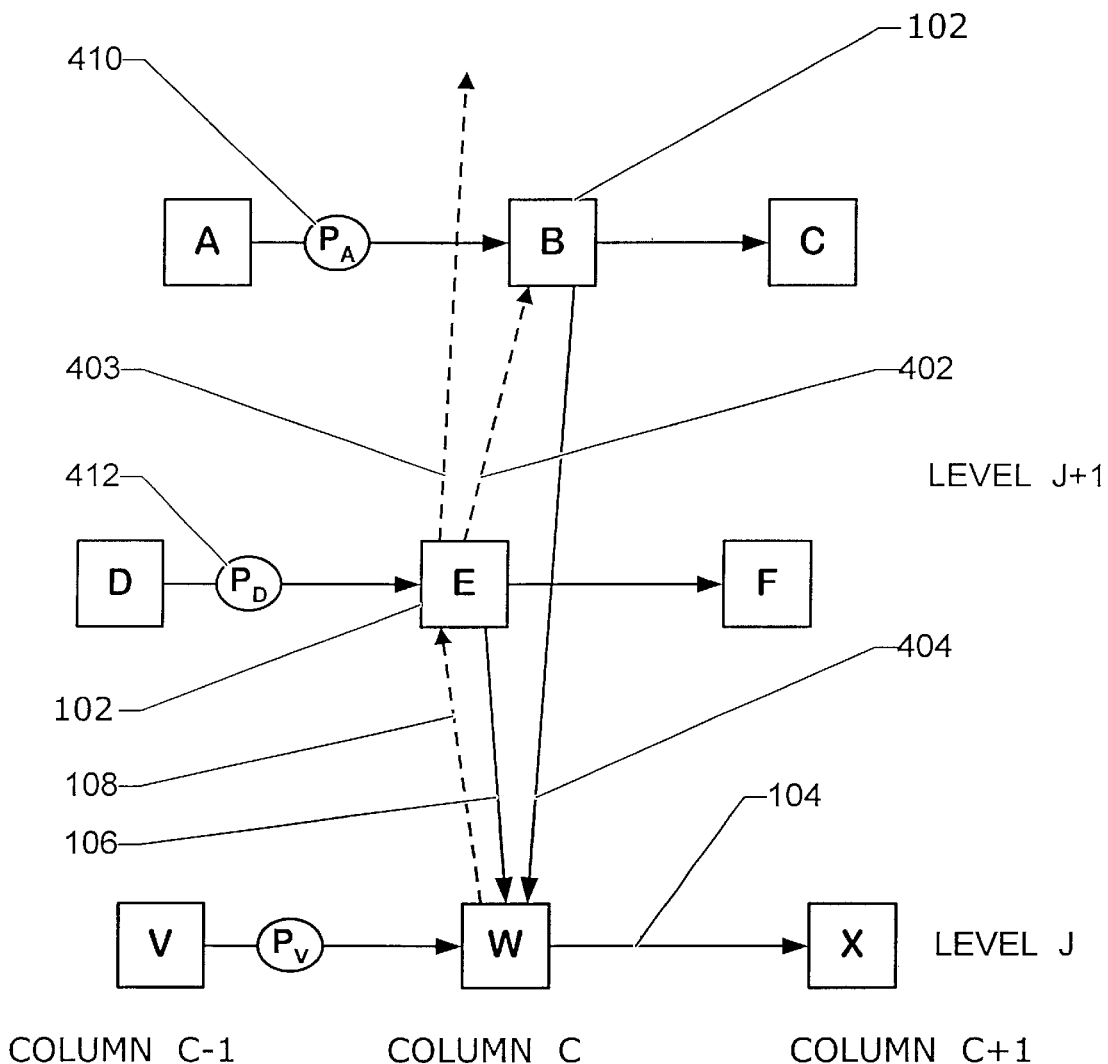
FIGS. 4A, 4B, and 4C are schematic block diagrams that show multiple examples of interconnections between cells that are suitable for usage in an interconnect structure such as the structure shown in FIG. 1.

A packet on a given level enters a control cell 102 in a control cell array 110 Referring to FIG. 4A, when a packet $P_A$ 410 enters a control cell B, logic associated with the control cell B can route the packet through the cell B to another cell C on the same level. Alternatively, the logic associated with the cell B can route packet $P_A$ to a cell X on a lower level, which is the desired outcome of using the concentrator structure and operating method.

When a packet enters a cell W from above on line 106 or 404, for example from cells B or E, the packet is sent without delay on line 104 to cell X in the next column.

Figure 4B:
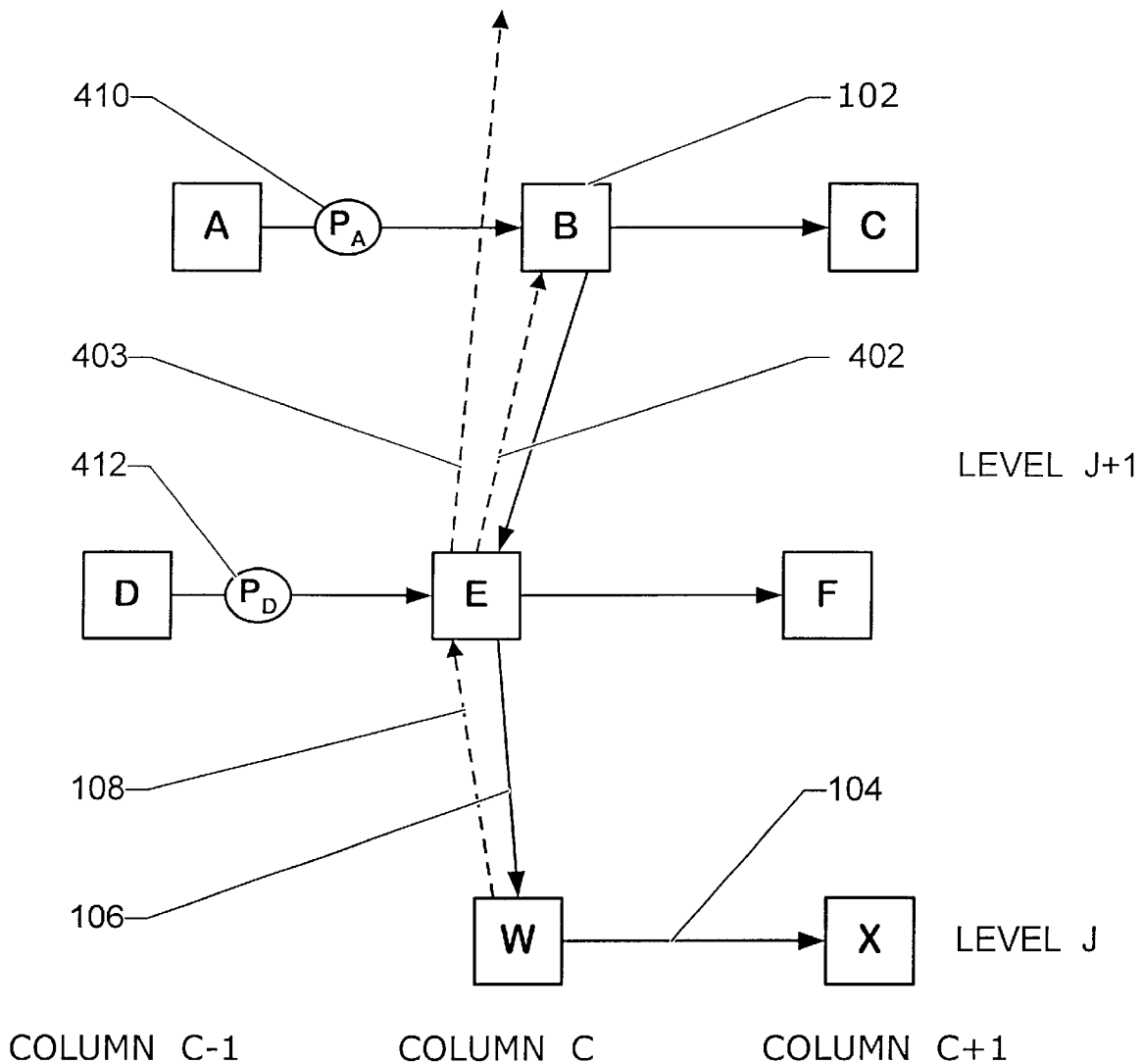
Figure 4C:
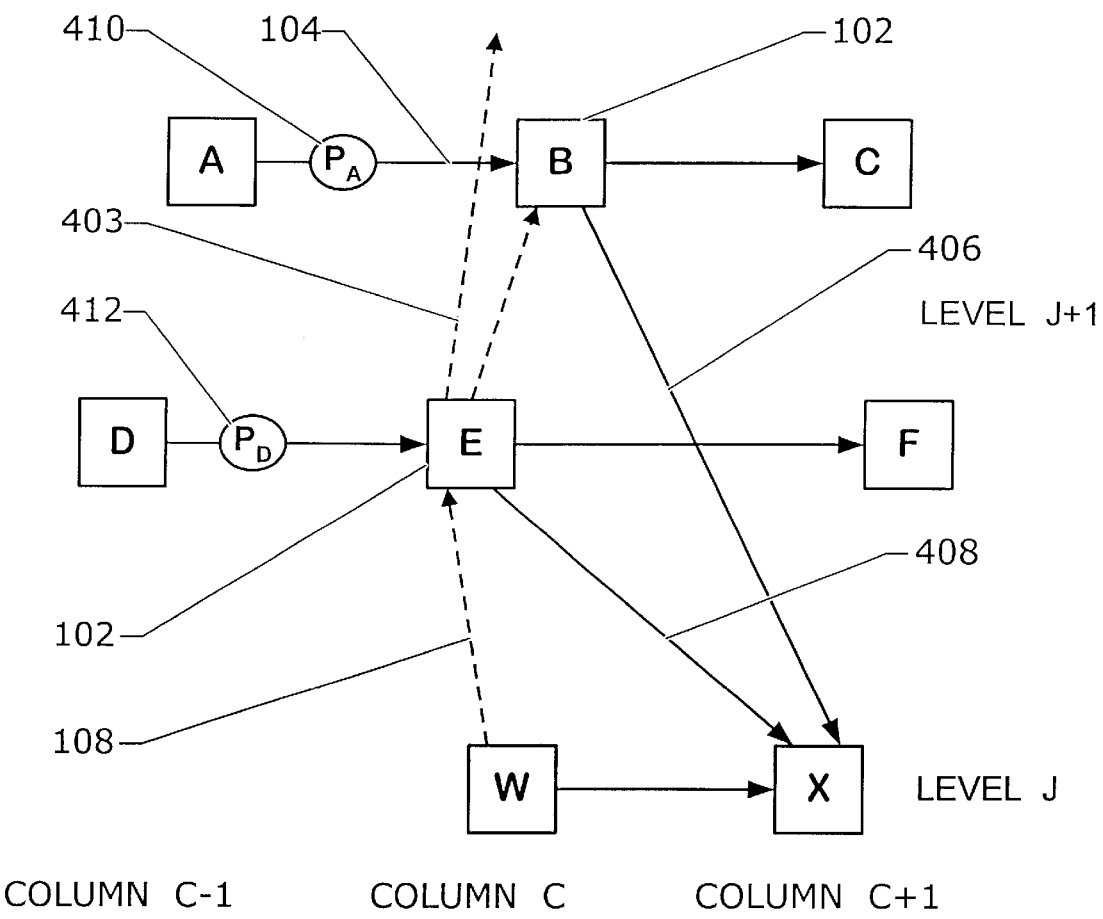

Therefore, when packet $P_A$ is routed from cell B to cell X, packet $P_A$ travels to cell W then immediately enters cell X. Referring to FIG. 4C in combination with FIG. 4A, when cell B routes packet $P_A$ down to line 406, the packet $P_A$ similarly enters cell X immediately. The diagrams shown in FIGS. 4A and 4B are functionally-equivalent examples of packet routing between cells. Implementation considerations may influence the selection of one routing technique over another.

The immediate "dropping-down" or "jumping" of a packet to a lower level promotes efficient operation of the concentrator interconnect structure. Fundamentally, if a cell on a given lower level is unoccupied by a packet, thus available to accept data, and that cell is connected to another cell on a higher level, then a packet at the higher-level cell will drop to fill the empty spot in the lower-level cell. Several dropping or jumping processes are suitable. Control cell structure determines the dropping or jumping technique. Control cell structure and overall data flow and timing are discussed in detail hereinafter.

FIG. 1 is an illustrative embodiment of a 32:8 concentrator with an 8 wide ribbon and three levels with a 2:1 ratio between levels, which yields a concentrator with an overall 4:1 concentration ratio. Other concentrator ratios are practical, as are other ribbon widths, desirably providing for a wide variety of input and output port counts. The concentration ratio can be increased by adding additional levels, by increasing the concentration ratio between levels, or both. An embodiment with a higher overall ratio than 4:1 has more than three levels. Other embodiments may use ratios other than a 2:1 ratio between levels. In the control cells illustrated in FIG. 1, only a portion of the data carrying lines and control signal carrying lines are illustrated. The additional lines are discussed with reference to structures shown in FIGS. 3A and 3B hereinafter.

Figure 2:
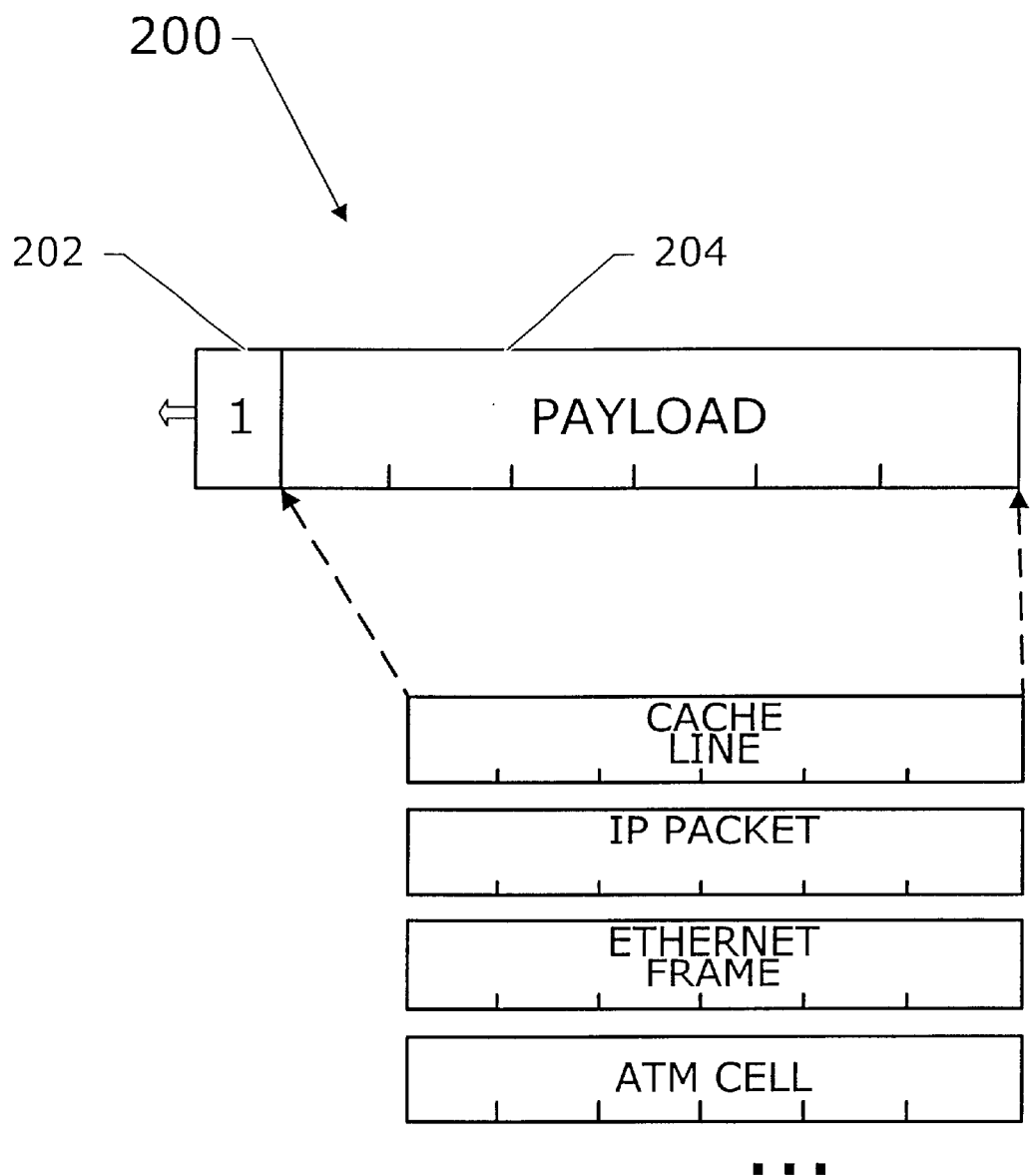
FIG. 2 is a data structure diagram that shows the format of data carried through the interconnect structure in the form of packets.

FIG. 2 illustrates a packet layout. A header 202 of a packet 200 includes a single bit that is always set to 1 and indicates that a packet is present. The remainder of the packet is called a payload 204. Various kinds of payloads are exemplified in FIG. 2. A packet can exit interconnect structure 100 from any output port so that additional header bits containing routing information are unnecessary.

If after leaving the concentrator 100, the packet travels into a network routing device, routing information for usage by the routing device may precede data bits in the payload. The routing bits are not used by the logic of the concentrator 100. The concentrator 100 always ignores payload contents 204.

Alternate embodiments of a concentrator (not shown) may use additional header bits that indicate quality of service. U.S. patent application Ser. No. 09/693.358 filed on even date herewith which is incorporated herein by reference in its totality, describes techniques for modifying the concentrator to give preference to packets with higher quality of service indicators in the header.

Figure 3A:
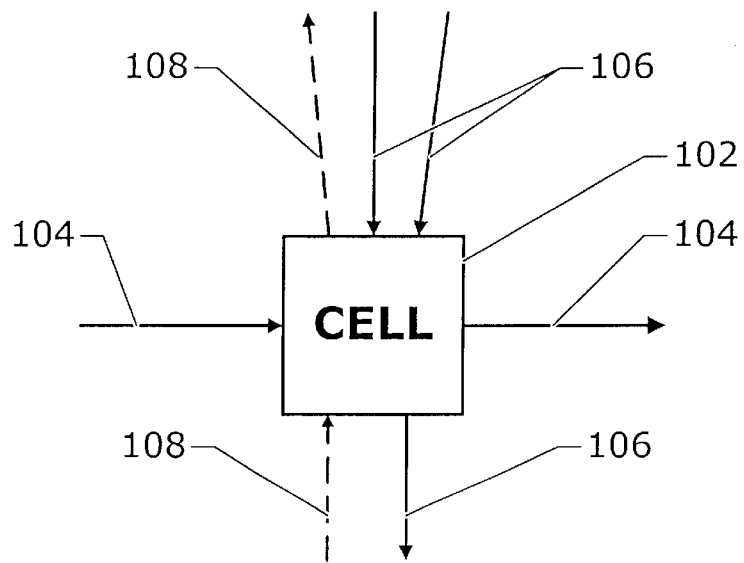
FIGS. 3A and 3B show examples of cells that can be used in the interconnect structure shown in FIG. 1 including different configurations of input and output ports.
Figure 3B:
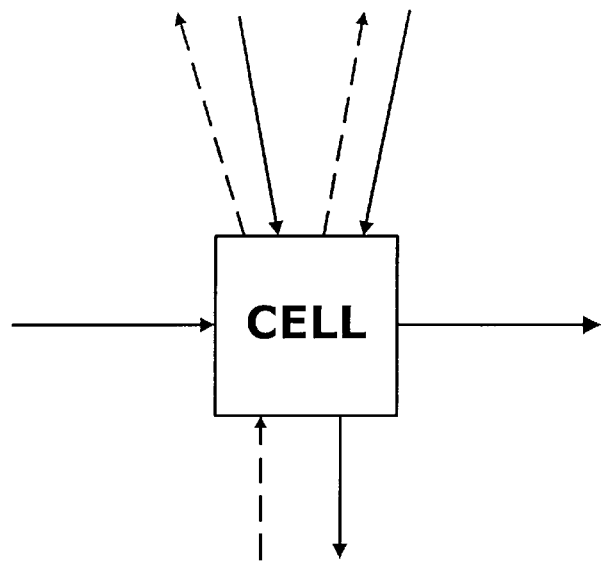

FIGS. 3A and 3B show examples of input and output ports of a cell. In the illustrative port configurations, a cell 102 receives data on two data input lines 106 from cells on higher levels and sends data on one data output line 106 to a cell on a lower level. The 2-to-1 ratio of vertical connections assists the data-concentrating operation of the concentrator. The cell 102 also includes one data input line 104 from a cell on the same level and one data output line 104 to a cell on the same level. In addition to data input and output lines between cells, additional interconnect lines 108 carry control information between cells. The control information is used by logic of the receiving cell to determine how to route data packets from the receiving cell. As in the patents and patent applications that are incorporated by reference, the control lines are used to enforce priority-based-on-position rules that govern data flow through the interconnect structure.

As described herein and in U.S. Pat. No. 6.289,021 and U.S. Pat. No. 5,996,020, two nodes attempting to send data to a third node communicate using control signals to resolve upstream contention. In other networks, packets entering a node N contend for output ports. In the systems described herein and in the incorporated references, packets contend for node input ports and the contention is resolved upstream using control signals. Upstream data flow is permitted by the unique topologies in the disclosed networks that allow two packets to contend for a particular downstream node input port. Resolution of the contention is based at least in part on the position of the nodes in the network. A node E with priority over a node B to send data to a third node V, sends a control signal directly or indirectly to B to enforce that priority.

FIG. 3A depicts a node that receives one control signal and sends one control signal.

FIG. 3B depicts a node that receives one control signal and sends two control signals.

The use of the two types of nodes is described in more detail in the discussion of the interconnect structure shown in FIG. 4A.

FIG. 3B shows an example of a cell that has priority over one cell on a higher level and one cell on the same level.

FIG. 4A is an enlarged depiction of a portion of the concentrator 100 shown in FIG. 1 with less than all data and control lines shown. Cells E and B are on the same level. Each of the cells E and B can individually be viewed as separate nodes, or the two cells E and B can be considered together as a single node.

The concentrator 100 operates in a manner that follows. For cells V, W, and X on the same level, if a packet $P_v$ is sent by cell V to cell W, and cell W sends the first bit of packet $P_v$ to cell X, then cell W sends a control signal to cell E at a higher level. Cell W sends packet $P_v$ to cell X on line 104. Cell W sends the control signal to cell E on line 108, informing cell E not to send data down line 106. Cell E in turn sends a control signal via line 402 informing cell B not to send data down line 404. In the case that cell W sends packet $P_v$ to cell X, any packet $P_D$ 412 entering cell E from cell D will be routed by the logic of cell E to cell F in the next column. Moreover, any packet $P_A$ entering cell B from cell A will be sent from cell B to cell C.

If at a given packet-arrival time, cell W does not send a packet to cell X, then cell W informs cell E of the cell W condition that cell W is not sending a packet M to cell X. Packet-arrival timing is discussed in detail in the description of U.S. Pat. No. 6.289,021, U.S. Pat. No. 5,996,020, U.S. patent application ser. No. 09/693.359 and hereinafter in the present disclosure.

Referring again to FIG. 4A, control information is contained in a control signal carried on control line 108 that is sent by cell W to cell E to inform cell E that no packet is sent from cell W to cell X. The line 104 from cell W to cell X is unoccupied by a packet and available to accept data. If cell D sends a packet $P_D$ to E in this condition, then cell E will detect the presence of packet $P_D$ by reading the one-bit header 202 of $P_D$. Logic associated with cell E uses the control signal from cell W and the header bit from packet $P_D$ to determine whether to route packet $P_D$ through cell W to cell X. Packet $P_D$ is free to use the data line 104 from cell W to cell X because cell W is not currently using data line 104 to send another packet to cell X.

Any packet that enters cell W from the level above is always sent directly to cell X. In an illustrative concentrator, logic associated with cell W is capable of routing packets arriving at cell W from another cell on the same level as cell W but does not have any control over packets entering cell W from a higher level. Packets from the higher level are passed through cell W on the data interconnect line 104 from cell W to cell X. In case cell E routes a packet PD downward through cell W to cell X, then cell E sends a control signal via control line 402 to cell B. The control signal carries information specifying that cell B is blocked from sending a packet on line 404 at this time. In the presence of the blocking control signal from cell E, if cell B receives a packet PA from cell A, then logic associated with cell B will cause the packet PA to be routed from cell B to cell C through line 104.

In one case, at a particular packet-arrival time, logic associated with cell W does not route a packet to cell X and cell E does not send a packet down line 106. Cell B is free to send a packet down line 404. Cell W sends a control signal, for example in the form of a single bit, through control line 108 informing cell E that cell W is not blocked from receiving a packet from cell E or cell B. Cell E responds to the control signal from cell W and absence of a message arriving from cell D by sending a control signal through line 402 informing cell B that cell W is not blocked from receiving a packet from cell B. If a packet $P_A$ arrives at cell B at this time, then cell B sends packet $P_A$ via line 404 through cell W to cell X. The packet $P_A$ first travels through line 404 and then through line 104. Line 104 is free to carry packet $P_A$ because line 104 is not used to carry a packet routed to cell X from either cell W or cell E.

Continuing with reference to FIG. 4A, node W is connected to send a control signal to node E via a single control signal carrying line 108. In addition to the illustrated interconnect lines, the nodes on level J also have control signal carrying lines (not shown) capable of carrying control signals from a node on level J–1, and data carrying lines (not shown) capable of carrying packets from the level J node to a node on level J–1. For example, the node W has the port structure illustrated in FIG. 3A including three data input ports, two data output ports, one control signal input port, and one control signal output port. Referring again to FIG. 4A, the node E receives control signals from node W through a line 108. Node E sends control signals to the node B on the same level and, if node E is not on the top level, node E also sends a control signal to a node on level J+2. In addition to the illustrated interconnect lines, the nodes on level J+1, if not the highest level, also have additional data and control interconnect lines connecting to nodes on level J+2. For example, node E has a port structure as illustrated in FIG. 3B including two data carrying lines from nodes on level J+2.

In case cell B is not on the top level, cell B is connected to a control line (not shown) for sending control signals to a cell on a higher level. The control line has the same function as the control line from cell W to cell E. If cell B sends packet $P_A$ to cell C, then cell B sends a blocking signal to a cell on the next level above.

If cell B is in column K–1 and in the top 24 rows of the top level, then cell B is in a position to send a message through the FIFO into the cells that receive input data from a device outside of the concentrator. Cells like cell B that can send messages to other cells that also receive messages from outside the structure have a special control signal line that controls the flow of messages into the interconnect structure from a device outside of the structure. A control signal on the special control signal line informs a device outside of the structure of a possible busy condition in data input column 120.

If cell B is in column K−1 on the top level but not in the top 24 rows of the top level, then cell B does not send a control signal outside the structure.

If cell E is not in the top level then cell E sends two control signals. Cell E sends a blocking signal on control signal line 402 to cell B when cell E sends a packet to cell W. Cell E sends a blocking signal up on a control signal line 403 to the next higher level when cell E sends a packet to cell F.

If cell E is in column K−1 and in the top 24 rows of the top level, then cell E sends a special control signal that controls the flow of messages into the interconnect structure from a device outside of the structure.

Stated generally, nodes with priority to send packets downward in the hierarchy have two control signal-sending lines as shown in FIG. 4B. Nodes without priority to send a packet down have only one control signal-sending line.

FIGS. 4A and 4B depict alternative embodiments of interconnect structures that are logically the same. A physical difference is that the structure shown in FIG. 4B sends packets from cell B to cell X first through cell E and then through cell W. A message can jump from cell B to cell X when cell E does not otherwise use line 106 to send data, and neither cell E nor cell W use line 104 to send data to cell X. The control structure shown in FIGS. 4A and 4B are the same and include control lines FIG. 4C depicts a third embodiment of an interconnect structure that is logically the same as the interconnect structures shown in FIGS. 4A and 4B. In FIG. 4C, cells E and B send packets directly to cell X, not through intermediate nodes. Control line structures are the same in the interconnect structures shown in FIGS. 4A, 4B, and 4C. The structures shown in FIGS. 4A, 4B, and 4C are physically different but logically equivalent.

Successful operation of the concentrator depends at least partly on timing. The first bit of the packet $P_v$ arrives at node W at a prescribed packet arrival time. The logic associated with the node W makes routing decisions based on the single bit header 202 of packet $P_v$ and the incoming control signal from a node on level J−1. The logic is simple in comparison to logic described in U.S. Pat. No. 6,289,021 and U.S. Pat. No. 5,996,020 that depend on control based on three bits rather than two. If a packet $P_v$ is present at node W and is not blocked from a node on a lower level, then node W sends packet $P_v$ to a lower level and sends a control signal to the node E on a higher level. The control signal from node W arrives at node E at the same time or near the same time that packets arrive at node E. Logic controls the timing so that packets arrive at node W before the packets arrive at node E.

Referring to FIG. 4C, for example an optical embodiment, logic predetermines a packet arrival time for packets arriving at node X. A packet sent from node E to node X must arrive at node X at the same time as a packet sent from node W to node X. As described hereinbefore, packets arrive at node W before packets arrive at node E. Therefore, the time for a packet to travel from node E to node X must be less than the time for packets to travel from node W to node X. In an optical embodiment, timing is adjusted by selecting the fiber length of the interconnect line from node W to node X to be shorter than the fiber length of the interconnect line from node E to node X. In this way, packets from a higher level can catch up to packets on a lower level to synchronize arrival time. Timing is discussed in detail in U.S. Pat. No. 5,996,020. The interconnect structure disclosed herein is more simple than the structure disclosed in U.S. Pat. No. 5,996,020.

In electronic embodiments, packets traveling between two nodes on the same level pass through two one-bit shift register cells. Nodes moving down a level bypass one of the register cells so that in the structures shown in FIGS. 4A, 4B and 4C, a packet bit travels from cell E to cell F in two clock cycles and from cell E to cell X in one clock cycle. Timing is discussed in detail in U.S. Pat. No. 6,289,021 and U.S. patent application ser. No. 09/693.359 While the timing in the structures disclosed herein is the same as the timing disclosed in U. S. Pat. No. 6,289,021 and U.S. Pat. No. 5,996,020, the node structure described herein is simplified.

Figure 5:
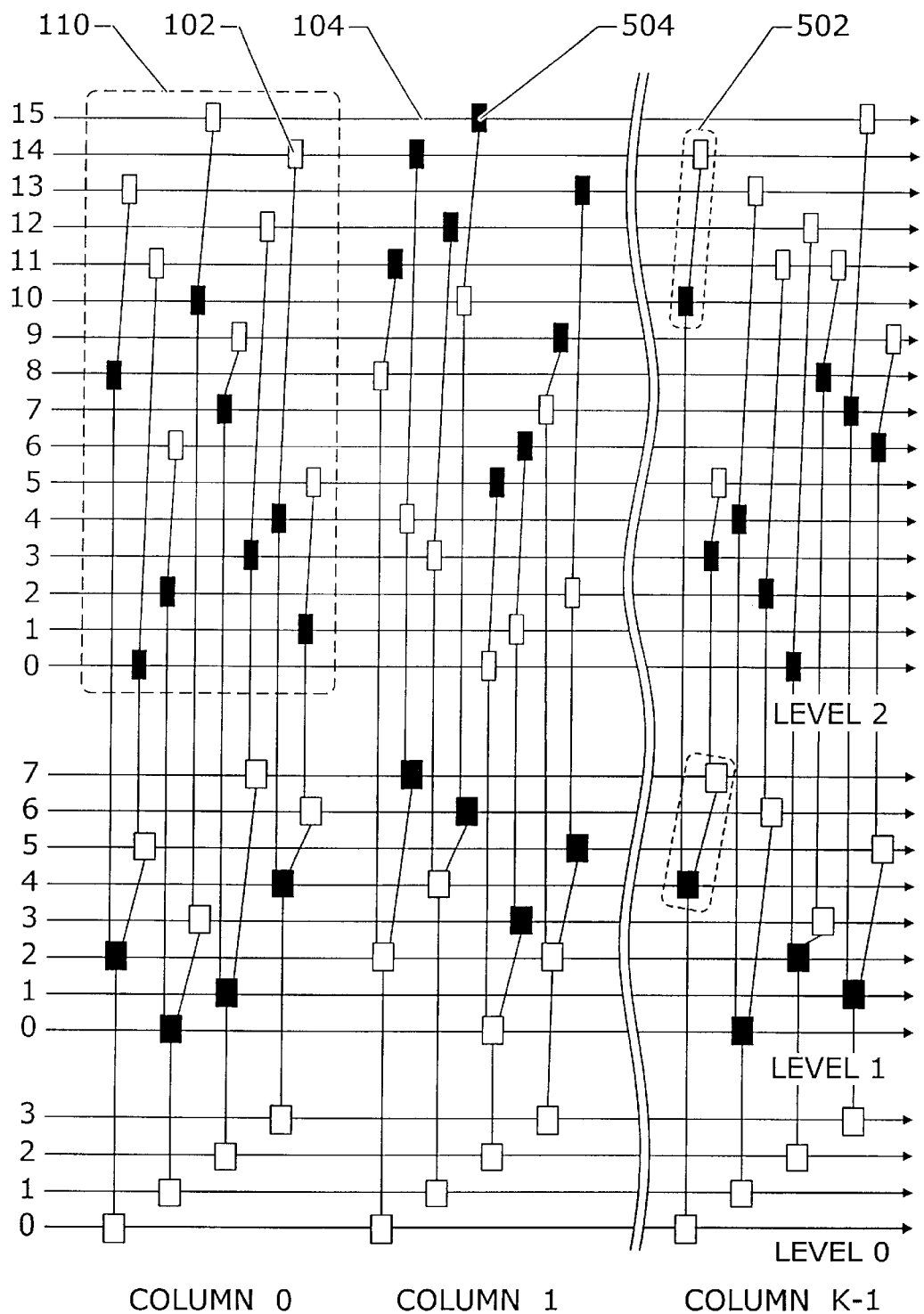
FIG. 5 is a schematic block diagram illustrating a priority of cells in an interconnect structure that is variable with respect to level.

The structures shown in FIGS. 1, 3A, 3B, 4A, 4B and 4C have the same priority for sending messages through the interconnect structure. Node W, the immediate predecessor of node X has first priority to send to node X. Node E has second priority to send to node X. Node B has third priority to send to node X where node X is closer to the output ports of the ribbon than node B. In other embodiments, the node furthest from the output end of the ribbon has priority. Referring to FIG. 5, the priority is variable with respect to columns so that if node B is an immediate successor to node A and node A is a cell without priority, then node B is a cell with priority.

FIG. 5 illustrates three columns and three levels of the interconnect structure. On each level and in each column is an array 110 of control cells 102. Cell-to-cell interconnections in the structure shown in FIG. 5 are the same as the interconnections illustrated in FIG. 4B. Cells are paired to form a node 502 so that both cells of the node pair are positioned to send data to a single node on the next lower level. In highly suitable embodiments of the concentrator, cells 102 on rows 104 within a control array 110 are randomly placed. Software simulation of a plurality of random placements can be performed to desirably select best-performing arrangements. Solid boxes 504 illustrate cells with higher priority in a node. Open boxes illustrate cells with low priority. The illustrative nodes each contain one higher priority cell and one lower priority cell. Along a row 104, a packet that has low priority at one column advantageously always has high priority at the next column on the same level.

If a node is considered to include only a single control cell, then each node has one data input line from the same level. Nodes that are not on the top level have two data input lines from a higher level. Each node has a data output line to one node on the same level. Nodes that are not on the bottom level have an additional data output line to a lower level. Each node that is not on the bottom level has one control input port. Nodes that are not on the top level have either one or two control signal output ports. Only nodes at an input column or columns have control signal output lines to external input sources. Input sources are allowed to send a packet into the concentrator only at a time indicated by a global clock signal, and only if no corresponding blocking signal is received from the top-level node. Input devices use the same timing and routing rules for sending a packet "down" into the concentrator that internal cells follow for routing a packet down to a lower-level cell.

One having ordinary skill in the art will readily implement many variations, modifications, additions and improvements of the basic concentrator described herein.

Alternative Topology Embodiments. In the concentrator disclosed hereinabove, a line leaving the FIFO on row J is connected to a line on row J–8 entering column 0. In a first alternative example, the line leaving the FIFO on row J is connected to the line entering column 0 on the same row J. The topology is changed such that the top level has 32 rings, the next level down in the hierarchy has 16 rings, and the bottom level has eight rings.

In a second alternative example that is similar to the interconnect structures in the patents and patent applications incorporated by reference hereinabove, a permutation is made between column K–1 and the FIFO column. A line leaving the FIFO on row J is connected to a line entering column 0 on the same row J. For some permutations, the resulting topology has one ring on each of the levels. In some cases data is always allowed to leave the concentrator from the output ports on column k–1 on level 0. In such cases the novel "barber pole" structure shown in FIG. 1 advantageously operates so that messages entering the top of the structure are always guaranteed to exit the structure in an amount of time bounded by a fixed constant.

In other cases, data under some conditions may be blocked from leaving the concentrator output ports, a structure with one ring per level may be more suitable.

Quality of Service Embodiment. U.S. patent application ser. No. 09/693,358 addresses a several techniques for implementing quality-of-service (QOS) priority In networks and concentrators. One simple technique is to include one or more additional header bits to designate a quality of service level. Referring to FIG. 4A, a QOS priority technique is implemented. If packet $P_D$ has the same or higher QOS priority as packet $P_A$, and cell W does not send a packet $P_y$ to cell X, then packet $P_D$ is sent to cell x However, if packet $P_D$ has a lower QOS priority than packet $P_A$ and cell W does not send a message $P_y$ to cell X, then packet $P_A$ is sent to cell X. To implement QOS priority, cells E and B are capable of reading the QOS header bits, and a control line from cell to cell E carries QOS information. Cell B is capable of transmitting QOS information to cell E either via the existing line 108 or via an additional control line.

Additional Level Embodiment. The illustrative example excludes buffers from the nodes. However, the concentrator does operate in the manner of a buffer and thus can handle bursty traffic. For example, if the average number of messages entering the concentrator is less than eight but occasionally more than eight messages enter the concentrator, possibly none of the messages that are targeted to enter the concentrator are blocked. The ability to handle bursty traffic can be increased by adding an additional level, level 3 in the example, to the concentrator. Level 3 can have 64 rows with data entering the top 32 rows. Inclusion of the additional level increases the effective buffer size of the entire concentrator. In other embodiments, several additional levels can be added to the structure to further increase the ability to handle bursty traffic.

Multiple Input Column Embodiment. One technique for implementing a 64:8 concentrator includes adding an additional level 3 with 64 rows using an eight-wrap ribbon. In an alternative technique, an additional input port terminal column is added to level 2, potentially doubling the amount of data that is received at the 32 lines in level 2. An additional shift register FIFO column can be added to level 2 to handle the increased traffic on the 32 lines. Whether the additional FIFO column is warranted depends on the timing of messages applied to the concentrator from input devices. Messages enter an input column from outside of the concentrator as messages enter the input column from nodes within the concentrator. The alternative technique is useful in applications in which the average data rate per input channel is lower and less bursty.

Different Interconnect Between Levels Embodiment. In a main embodiment of U.S. Pat. No. 5,996,020, each node includes a single control cell and each node at a lower level is connected to only one node at a higher level in the hierarchy. One having ordinary skill in the art can adapt the U.S. Pat. No. 5,996,020 structure and functionality to the concentrator disclosed herein so that only half the lines in a particular level above the bottom level sends messages down to the next lower level in a particular time step.

In an embodiment described in detail in U.S. patent application Ser. No. 09/693,359 four control cells arc combined into a single node that is capable of sending data to four cells. One having ordinary skill in the art can modify the structure so that four cells on a particular level form a node that is capable of sending data to two cells on a lower level.

Other Variations. The embodiments discussed in the preceding paragraphs are variants of embodiments in U.S. Pat. No. 6,289,021 and U.S. Pat. No. 5,996,020. One having ordinary skill in the art would be able to modify the multiple structural and functional variations described in U.S. Pat. No. 6,289,021 and U.S. Pat. No. 5,996,020 in combination with the description herein to form various embodiments of a concentrator.

Referring again to FIG. 5, two control cells on a level are positioned to send data to a single control cell on the next level lower in the hierarchy. Node 502 illustrates the structure of a 2:1 node concentrator in which two cells in a node are capable of sending data to one node on a lower level. In an operational example, a message $M_1$ is sent from the control cell on row 2 of level 1, column 0, to the cell on row 2 of level 1, column 1. In the same operational time period, a message $M_2$ arrives at the control cell on row 8 of level 2, in column 0. Message $M_1$ is positioned to block message $M_2$ and message $M_2$ will remain on the same level. Therefore, in the topology shown in FIG. 5, a single message on a level can block a message on one level higher.

Figure 6A:
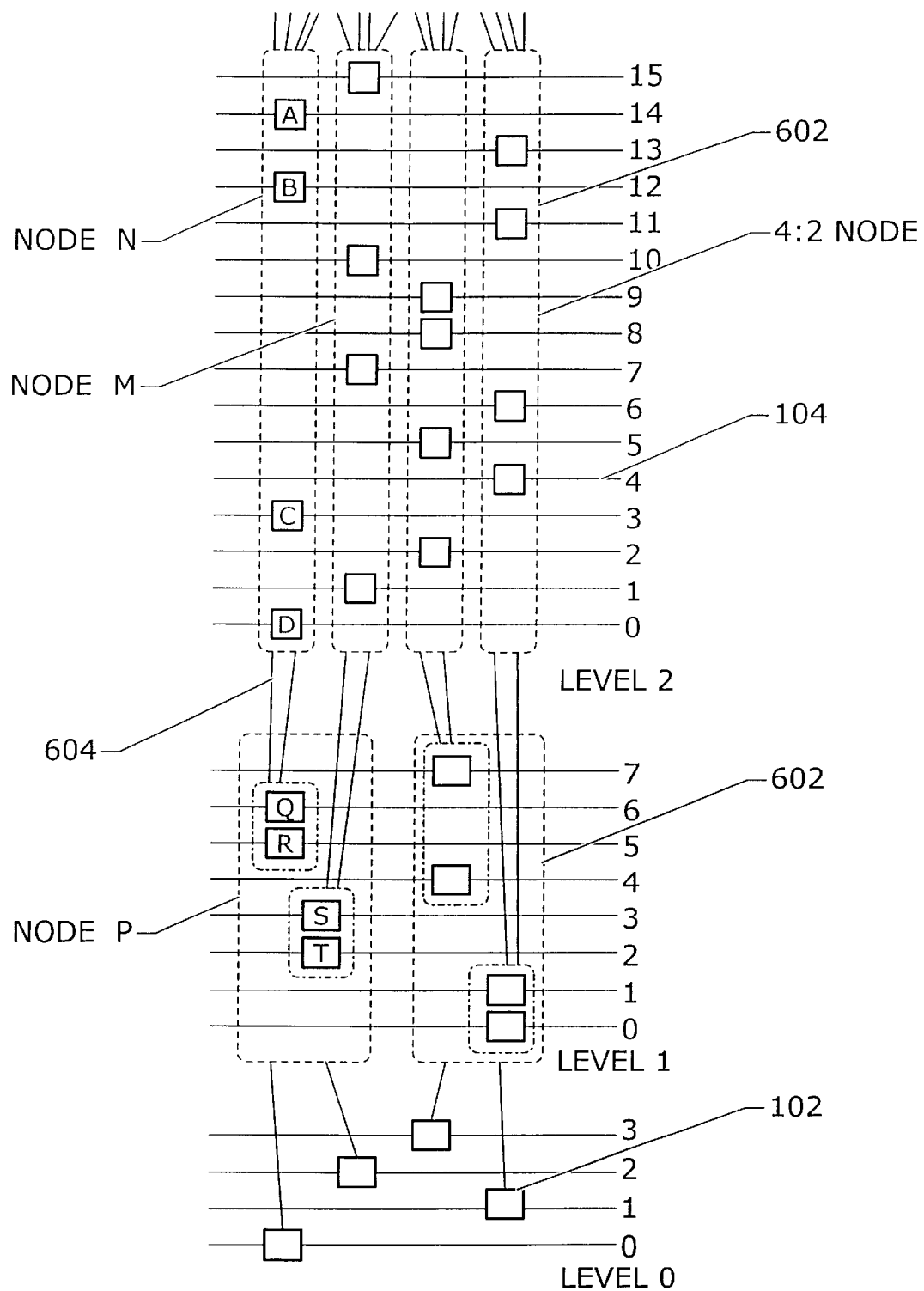
FIGS. 6A and 6B are a schematic block diagrams that show two examples of groupings of interconnected cells into nodes.
Figure 6B:
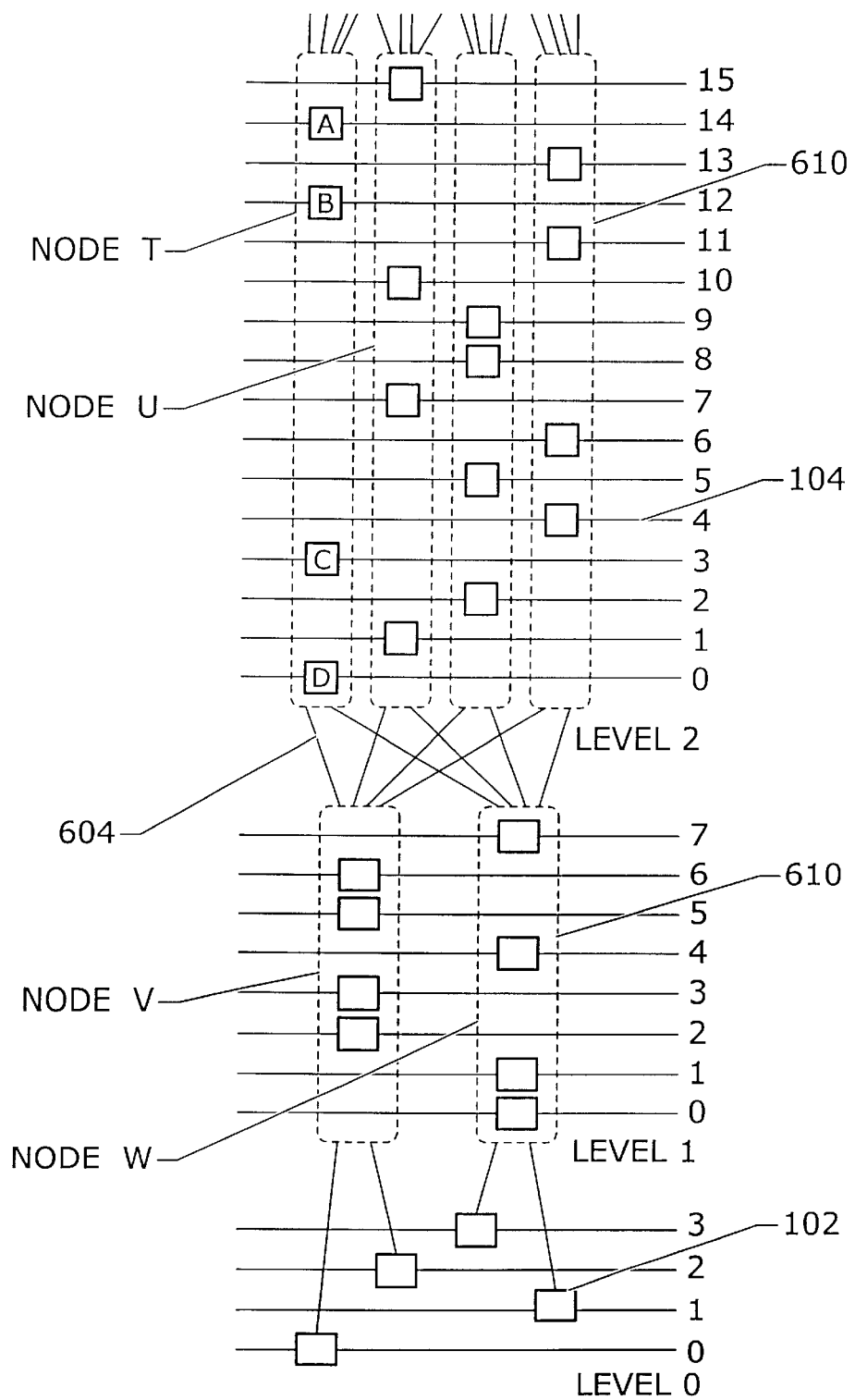

Referring to FIGS. 6A and 6B cells are grouped, for example into nodes 602, so that four cells on a level are positioned to send data to two cells on a next lower level on interconnect lines 604. A node on each level contains four control cells. Each of the four cells in the leftmost node on level 2 is capable of sending data to either of two cells on level 1. In one example shown in FIG. 6A, four cells in node N are capable of sending data to cells Q and R of node P. Similarly, four cells in node M are capable of sending data to cells S and T in node P. No one message on a level can block a message on a higher level so that throughput from one level to the next lower level can be increased. FIG. 6A illustrates the structure of a 4:2 node concentrator in which four cells in a node are capable of sending data to either of two nodes on a lower level. In other embodiments, for example as shown in FIG. 6B, logic can be added to increase the number of cells in a node 610. For example, all eight cells in nodes T and U can be controlled in combination to send data to all four cells in either or both of nodes V and W to form an 8:4 node concentrator. More complex nodes are used in designs that have increased throughput at the expense of more logic per node.

Figure 7:
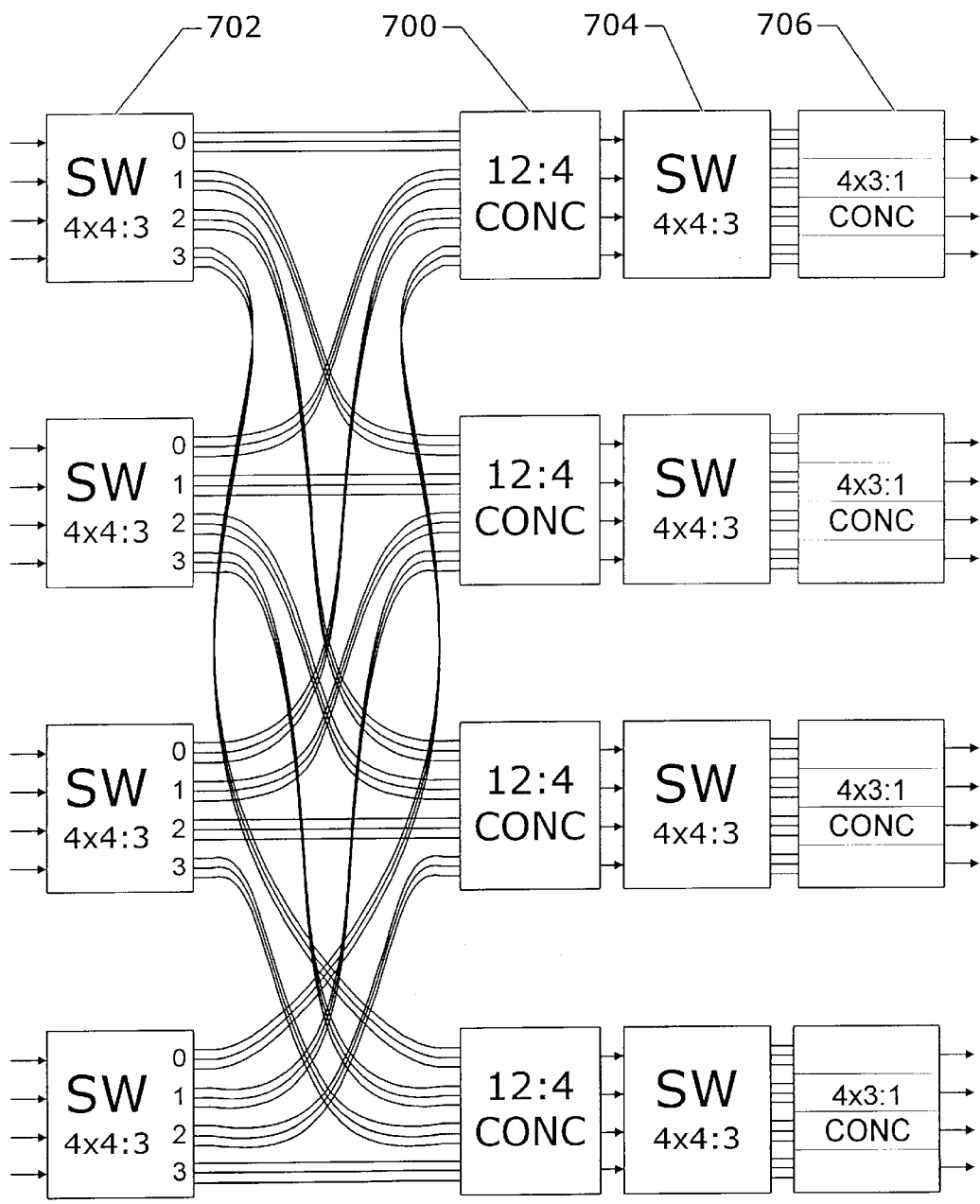
FIG. 7 is a schematic block diagram illustrates a system utilizing a plurality of concentrators.

Referring to FIG. 7, a schematic block diagram illustrates a system utilizing a plurality of concentrators and a plurality of switches. U.S. Pat. No. 6,289,021 and U.S. Pat. No. 5,996,020 illustrate techniques and structures for efficiently implementing a network on a semiconductor chip. The system shown in FIG. 7 illustrates a technique and structure for forming a larger network from several chips. U.S. Pat. No. 6,289,021 taught a technique for arranging smaller networks into a twisted cube. The system illustrated in FIG. 7 improves the twisted cube structure.

In practice, extremely large networks can be built using the illustrative multiple-chip modules. For example, 128 switch chips and 128 concentrator chips can be combined. For example, each of the 128 chips can contain 64 one-line input ports and 64 three-line output ports. The combination forms a single-chip with $64^2$ input lines and $64^2$ output lines. The example illustrated in FIG. 7 is a much smaller system that is useful for illustrative purposes. Much larger systems can be practically constructed.

Networks 702 and 704 shown in FIG. 7 are of the type described in U.S. Pat. No. 6,289,021 and U.S. Pat. No. 5,996,020 that have three levels and a plurality of columns. Each level has four rows. Three of the columns on level 0 contain output ports. In the illustrative system, each of the chips 702 has three output lines that are sent to address 0, three output lines sent to address 1, three output lines sent to address 2, and three output lines sent to address 3. The bottom concentrator receives all twelve output lines that are connected to address 0. The three other concentrators each receive twelve input lines that are connected to the addresses 1, 2, and 3 as is appropriate.

The networks described in U.S. Pat. No. 6,289,021 and U.S. Pat. No. 5,996,020 send data from the different columns at different times. In the system shown in FIG. 7, messages from different columns pass through suitable delay line FIFOs (not illustrated) so that the messages from all columns arrive at the concentrators 700 at the same time.

Concentrators 700 have 4-wide ribbons of rows on 3 levels so that level 0 has four rows, level 1 has eight rows and level 2 has sixteen rows. On level 2, the lower twelve of the sixteen rows are positioned to receive data from switches 702 at an input port (not shown) of the concentrator 700.

For applications in which data is expected to be extremely bursty, additional layers may be added to the concentrators 700. Concentrators 700 concentrate data from twelve channel output lines from each chip in the first column onto four input lines in the second row. The concentrators also spread or disperse the data in time to reduce the possibility of hotspots. Data from the concentrators 700 is applied into a second column of switch chips 704.

Messages exit the concentrators 700 synchronously so that no FIFOs are needed between the concentrator modules 700 and the switch chips 704. Messages emerge from switches 704 and pass through FIFOs (not shown) to align the messages in time for entry into a second column of concentrator modules 706. Each of the concentrator chips 706 contains four concentrators. Each of the four concentrators in concentrator chip 706 has a ribbon with the width of one row.

The second-column concentrators can be designed with three levels with level 0 having one row, level 1 having two rows and level 2 having four rows. Three of the four rows in the top level are capable of receiving input data. Again, for bursty traffic, the addition of additional rows to the concentrators in concentrator chips 706 may be warranted.

Control lines (not shown) supply control signals from downstream chips to upstream chips to inform the upstream chips of data blocking conditions in downstream chips. For example, if switch 704 is not able to receive data from concentrator 700, then that data is redirected to one of the top rows of the concentrator 700. Since only the lower twelve rows of the concentrators 700 receive messages from the upstream switches 702, the top four rows are always free to receive data.

Control lines back to the top switch can come from a number of places. In one embodiment, buffers can be placed between the concentrator 800 and the switch 804. When the buffers fill above a capacity level, control signals can be selectively sent to output ports of switches 802 that feed the filled buffers. Alternatively, the control signals can originate from within the concentrator from nodes located in upper levels in columns to the left that receive messages in congested traffic but do not receive messages in light traffic. The control signals block particular output ports of switch 800 based on traffic in the concentrator.

For all sizes of concentrators, feedback of blocked messages to the top rows of a concentrator is always successful because the maximum number of messages to be fed back is equal to the width of a ribbon and the ribbon-width is always open in the top rows of the concentrator.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, one or ordinary skill in the art could similarly apply the first and second quality-of-service techniques to the other interconnect structures described herein.

In the claims, unless otherwise indicated the article "a" is to refer to "one or more than on".

What is claimed is:

1. An interconnect structure comprising:

a plurality of data transmission lines; and a plurality of nodes arranged on the plurality of data transmission lines;

the data transmission lines having a plurality of nodes for data entry from outside of the interconnect structure;

the data transmission lines having a data exit end allowing data to exit the system; and the plurality of nodes including nodes A, B, and X, and the plurality of data transmission lines including lines $L_1$, and $L_2$, the node A on the line $L_1$ being capable of transmitting data to the node B, an immediate successor to node A on line $L_1$, and the node A being capable of transmitting data to the node X on the data transmission line $L_2$, the distance from node X to the data exit end of transmission line $L_2$ being less than the distance from node B to the data exit end of transmission line $L_1$.

2. An interconnect structure in accordance with claim 1 wherein:

the node X has an immediate predecessor node W such that the node W has priority over the node A to send data to the node X.

3. An interconnect structure in accordance with claim 1 wherein:

messages entering the structure are never discarded.

4. An interconnect structure comprising:

a plurality of transmission rings;

a plurality of nodes arranged in the plurality of data transmission rings;

the data transmission rings being arranged in a plurality of levels from a highest level L to a lowest level 0;

rings on level L having one or more nodes capable of receiving data from outside the interconnect structure;

the plurality of nodes including nodes A, B, C, X, and Y, the node B being on a level J between level 0 and level L;

the node A being an immediate predecessor to the node B on the same data transmission ring as the node B;

the node C being an immediate follower to the node B on the same data transmission ring as the node B;

the node X being on a level K greater than the level J;

the node Y being on a level P smaller than the level K;

the node B being capable of receiving data from the node A and the node X;

the node B being capable of sending data to the node C and the node Y, the data being self-routed using no header information identifying a target for a data message.

5. An interconnect structure in accordance with claim 4 wherein:

the data is self-routed at least in part based on quality of service information included in the header.

6. An interconnect structure comprising:

a plurality of data transmission lines;

a plurality of nodes arranged on the plurality of data transmission lines;

the plurality of nodes including a node B and a subset S of nodes, the node subset S including one or more nodes capable of sending data to the node B, the nodes in the subset S having a priority relationship for sending a message to the node B so that for a node N in the subset S and a message M arriving at the node N then the node N is never blocked from sending the message M to node B by a message from a node in the subset S with lower priority than the node N for sending a message to the node B, the message M having no header information indicating a target of the message M.

7. An interconnect structure according to claim 6 further comprising:

a node subset $T_N$ being a subset of nodes to which the node N is capable of routing messages;

a logic associated with the node N that ranks members of the subset $T_N$ from a node most desirable to receive the message M to a node least desirable to receive the message M, the logic associated with the node N sending the message M to the most desirable unblocked member of the subset $T_N$.

8. An interconnect structure according to claim 7 further comprising:

a node A that is an immediate predecessor to the B, the node A having the highest priority to send a message to the node B.

9. An interconnect structure comprising:

a plurality of nodes arranged in a structure including:

an hierarchy of levels from a source level to a destination level;

a plurality of nodes in nonintersecting paths extending along the levels; and a plurality of nodes in a cross-section of the nonintersecting paths of the levels, the number of nodes in a cross-section of the source level being greater than the number of nodes in a cross-section of the destination level so that the interconnect structure is a concentrator, the level of a node being determined entirely by the position of the node in the structure; and a plurality of interconnect lines coupling the nodes in the structure including for a node N on a pathway P of a level L including:

a message input interconnect line coupled to a first adjacent node on the pathway P of the level L;

a message output interconnect line coupled to a second adjacent node on the pathway P of the level L;

at least one message interconnect line coupled to one or more nodes sourceward of the node N for receiving data from a node sourceward in the hierarchy, and/or coupled to one or more nodes destinationward of the node N for sending messages from a node destinationward in the hierarchy; and at least one control interconnect line coupled to a node sourceward of the node N for sending a control signal to the sourceward node, and/or coupled to a node destinationward of the node N for receiving a control signal from the destinationward node.

10. An interconnect structure according to claim 9 further comprising:

a logic associated with the node N that is capable of determining whether the node N is occupied by a message on the pathway P of the level L and on the basis of the determination sending a control signal to the sourceward node, speeding advancement of a message at the sourceward node.

11. An interconnect structure according to claim 9 further comprising:

a plurality of columns, each column interconnecting a plurality of nodes in a cross-section of the nonintersecting paths in a level, the columns including the interconnections between nodes including sourceward and destinationward couplings on the at least one message interconnect lines and on the at least one control interconnect lines.

12. An interconnect structure according to claim 9 further comprising:

a plurality of FIFO buffers coupled to the respective nonintersecting paths extending along the levels.

13. An interconnect structure according to claim 9 wherein:

the plurality of interconnect lines coupling the nodes in the structure including for the node N on a pathway P of a level L further include:

a first control output interconnect line coupled to a node sourceward of the pathway P and in the level L; and a second control output interconnect line coupled to a node in a level sourceward of the level L.

14. An interconnect structure according to claim 9 wherein:

the plurality of interconnect lines coupling the nodes in the structure including for the node N on a pathway P of a level L further include:

a first message input interconnect line coupled to a node sourceward of the pathway P and in the level L;

a second message input interconnect line coupled to a node in a level sourceward of the level L; and a control output interconnect line coupled to a node sourceward of the pathway P and in the level L.

15. An interconnect structure according to claim 9 wherein:

the plurality of interconnect lines coupling the nodes in the structure including for the node N on a pathway P of a level L further include:

a first control output interconnect line coupled to a node sourceward of the pathway P and in the level L;

a second control output interconnect line coupled to a node in a level sourceward of the level L; and a message input interconnect line coupled to a node sourceward of the pathway P.

16. An interconnect structure according to claim 9 further comprising:

priority nodes among the plurality of nodes, other nodes being nonpriority nodes, the priority nodes and the nonpriority nodes being selectively interconnected.

17. An interconnect structure according to claim 9 further comprising:

a logic that interconnects nodes into groups to concentrate n nodes on a sourceward path to m nodes on a destinationward path, n being greater than m and n:m being a concentration ratio.

18. An interconnect structure according to claim 9 further comprising:

a ribbon of interconnect lines connecting a plurality of nodes in the nonintersecting paths, the ribbon of interconnect lines winding through the levels from the source level to the destination level, the number of turns of a winding decreasing from the source level to the destination level; and a plurality of columns coupling the nodes in cross-section of the ribbon through all windings of the levels.

19. An interconnect structure according to claim 18 wherein:

the number of windings of the interconnect line ribbon is reduced by one-half for each level from the source level to the destination level.

20. An interconnect structure comprising:

a ribbon of interconnect lines connecting a plurality of nodes in nonintersecting paths, the ribbon of interconnect lines winding through a plurality of levels from the source level to the destination level, the number of turns of a winding decreasing from the source level to the destination level; and a plurality of columns formed by interconnect lines coupling the nodes across the ribbon in cross-section through the windings of the levels.

21. An interconnect structure according to claim 20 further comprising:

a plurality of input ports coupled to the nodes in a first column of the source level.

22. An interconnect structure according to claim 20 further comprising:

a plurality of output ports coupled to the nodes in a last column of the destination level.

23. An interconnect structure according to claim 20 further comprising:

a plurality of FIFO buffers coupled to the respective nonintersecting paths extending along the levels.

24. An interconnect structure according to claim 20 further comprising:

the number of windings of the interconnect line ribbon is reduced by one-half for each level from the source level to the destination level.

25. An interconnect structure according to claim 20 further comprising:

control lines extending from nodes inside the interconnect structure to one or more devices outside the interconnect structure to control entry of messages into the interconnect structure.

26. An interconnect structure according to claim 20 further comprising:

a logic that interconnects nodes into groups to concentrate n nodes on a sourceward path to m nodes on a destinationward path, n being greater than m and n:m being a concentration ratio.

27. An interconnect structure according to claim 20 further comprising:

a logic that is capable of determining whether a node is occupied by a message on the path of a level and on the basis of the determination sending a control signal to a sourceward node, speeding advancement of a message at the sourceward node.

28. An interconnect structure according claim 20 further comprising:

priority nodes among the plurality of nodes, other nodes being nonpriority nodes, the priority nodes and the nonpriority nodes being selectively interconnected.

* * * * *